(12) United States Patent
Falkiner

(10) Patent No.: US 7,631,715 B2
(45) Date of Patent: Dec. 15, 2009

(54) GOLF CADDY VEHICLE

(76) Inventor: Thomas L. Falkiner, 66 Bertie Street, Fort Erie, ON (CA) L2A 1X9

( * ) Notice: Subject to any disclaimer, the term of this patent is extended or adjusted under 35 U.S.C. 154(b) by 0 days.

(21) Appl. No.: 12/118,116

(22) Filed: May 9, 2008

(65) Prior Publication Data

US 2009/0277700 A1    Nov. 12, 2009

(51) Int. Cl.
    *B62D 61/06*    (2006.01)
(52) U.S. Cl. .................. 180/215; 180/210; 180/908; 280/DIG. 5; 297/188.1
(58) Field of Classification Search ............. 180/65.1, 180/908, 208, 210, 215–217; 280/DIG. 5, 280/638, 639, 35, 651; 297/195.1, 195.13, 297/188.1, 188.09
    See application file for complete search history.

(56) References Cited

U.S. PATENT DOCUMENTS

| | | | |
|---|---|---|---|
| 2,918,134 A | | 12/1959 | Jensen |
| 3,354,975 A | * | 11/1967 | Stuart .................. 180/208 |
| 3,369,629 A | | 2/1968 | Weiss |
| 3,388,761 A | | 6/1968 | Arpin |
| 3,483,937 A | * | 12/1969 | Vann .................. 180/208 |
| 3,513,924 A | * | 5/1970 | Jackson .................. 180/14.1 |
| 3,580,349 A | | 5/1971 | Brennan et al. |
| 3,605,929 A | | 9/1971 | Rolland |
| 3,608,659 A | | 9/1971 | Gardner |
| 3,948,332 A | | 4/1976 | Tyner |
| 4,431,205 A | | 2/1984 | Speicher et al. |
| 4,533,013 A | | 8/1985 | Hightower |
| 4,756,539 A | * | 7/1988 | Sneddon .................. 280/40 |
| 4,757,868 A | | 7/1988 | Cresswell |
| 4,861,058 A | * | 8/1989 | Cresswell .................. 280/278 |
| 4,874,055 A | | 10/1989 | Beer |
| 5,036,938 A | | 8/1991 | Blount et al. |
| 5,228,533 A | | 7/1993 | Mitchell |
| 5,277,267 A | | 1/1994 | Tiffany et al. |
| 5,307,889 A | | 5/1994 | Bohannan |
| 5,328,193 A | | 7/1994 | Shiew |
| 5,346,028 A | | 9/1994 | Cassano |
| 5,388,659 A | | 2/1995 | Pepe |
| 5,526,894 A | | 6/1996 | Wang |
| 5,727,642 A | | 3/1998 | Abbott |
| 5,816,614 A | | 10/1998 | Kramer, Jr. et al. |
| 5,879,022 A | | 3/1999 | Winton |

(Continued)

FOREIGN PATENT DOCUMENTS

DE    8619830 B    12/1986

(Continued)

*Primary Examiner*—Ruth Ilan
(74) *Attorney, Agent, or Firm*—Hodgson Russ LLP

(57) ABSTRACT

A golf caddy vehicle comprise a seat assembly mounted on a frame of the vehicle at an attachment location ahead of an axis of rotation of a pair of rear drive wheels via at least one spring element. A pair of rear legs of the seat assembly are pivotally coupled to the at least one spring member at a location behind the axis of rotation of the rear drive wheels, and a pair of front legs of the seat assembly are releasably attached to the frame by a pair of frictional fittings which may be formed of vibration damping material. The seat assembly pivots back to allow a golf bag to be loaded onto the vehicle frame and straddled by the seat assembly.

10 Claims, 2 Drawing Sheets

U.S. PATENT DOCUMENTS

| | | | |
|---|---|---|---|
| 6,099,020 A * | 8/2000 | Liao | 280/643 |
| 6,273,206 B1 | 8/2001 | Bussinger | |
| 6,276,470 B1 | 8/2001 | Andreae, Jr. et al. | |
| 6,474,427 B1 | 11/2002 | Tunnecliff | |
| 6,659,208 B2 | 12/2003 | Gaffney et al. | |
| 6,659,210 B2 | 12/2003 | Tyson | |
| 6,695,081 B2 | 2/2004 | Chu et al. | |
| 7,086,491 B2 | 8/2006 | Matte | |
| 7,210,705 B2 | 5/2007 | Chen et al. | |
| 7,537,076 B2 * | 5/2009 | Falkiner | 180/208 |
| 2004/0188984 A1 | 9/2004 | Cassoni | |
| 2008/0023236 A1 | 1/2008 | Falkiner | |

FOREIGN PATENT DOCUMENTS

| | | |
|---|---|---|
| GB | 2127364 A | 4/1984 |
| JP | 8322976 A | 12/1996 |
| WO | 2004031016 A1 | 4/2004 |

\* cited by examiner

GOLF CADDY VEHICLE

FIELD OF THE INVENTION

The invention relates generally to golf carts and personal golf caddy vehicles, and more particularly to an arrangement for mounting a seat on a personal golf caddy vehicle.

BACKGROUND OF THE INVENTION

A personal golf caddy vehicle is known from U.S. Patent Application Publication No. 2008/0023236 A1 by the inventor of the present invention. The vehicle described in this publication includes a frame on which a pair of rear drive wheels are mounted, and a front steering assembly rotatably coupled to the frame carries a steerable front wheel for controlling direction. The described vehicle includes a seat arranged to straddle a golf bag which may be supported at an inclined angle on the frame, such that when the vehicle is in use, the operator appears to riding the golf bag. The seat is mounted on four legs that extend downward, two on each side of the golf bag, such that a bottom end of each leg is received in a respective mounting receptacle fixed to the vehicle frame. More particularly, a pair of front receptacles are provided along each side of an inclined portion of the frame, and a pair of rear receptacles are provided at each rear corner of the frame behind the axle of the rear drive wheels. A thumb screw is adjustable radially into each receptacle to releasably secure the received leg end in place.

The vehicle as disclosed in Publication No. 2008/0023236 A1 suffers from certain drawbacks. In order to load and unload a golf bag from the vehicle, the four respective thumbscrews must be loosened and the seat/leg assembly removed. In practice, this proves to be inconvenient. Moreover, load distribution of a rider's weight onto the rear of the frame behind the drive wheel axle introduces a tendency for the vehicle to tip backwards when climbing a hill. Finally, the disclosed arrangement for mounting the seat on the frame lacks good shock absorption properties important to a comfortable ride.

Therefore, it would be desirable to solve these problems to enhance the ease of use, safety, and comfort of the vehicle.

SUMMARY OF THE INVENTION

The problems described above are solved by a golf caddy vehicle of the present invention. In an embodiment of the invention, the golf caddy vehicle generally comprises a frame configured to support a golf bag, a pair of rear drive wheels connected to the frame for rotation about a rear axis, at least one spring element fixed to the frame at an attachment location aligned with or ahead of the rear axis, and a seat assembly connected to the frame and arranged to straddle the golf bag, wherein the seat assembly is pivotally coupled to the at least one spring element at a location aligned with or behind the rear axis, and the seat assembly pivots relative to the frame to allow the golf bag to be loaded onto or unloaded from the frame.

The seat assembly may include a seat, a pair of front legs extending generally downward from the seat, and a pair of rear legs also extending generally downward from the seat. Respective bottom ends of the pair of rear legs may be pivotally coupled to the at least one spring element. The at least one spring element may be embodied as a pair of leaf springs each having a first end fixed to the frame at the attachment location and a second end located behind the rear axis, and the bottom ends of the pair of rear legs may be pivotally coupled to the second ends of the pair of spring elements.

The seat assembly may also include a pair of front legs each having a bottom end releasably attached to the frame, such as by a respective frictional fitting. The frictional fittings may be formed of a vibration damping material such as rubber.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
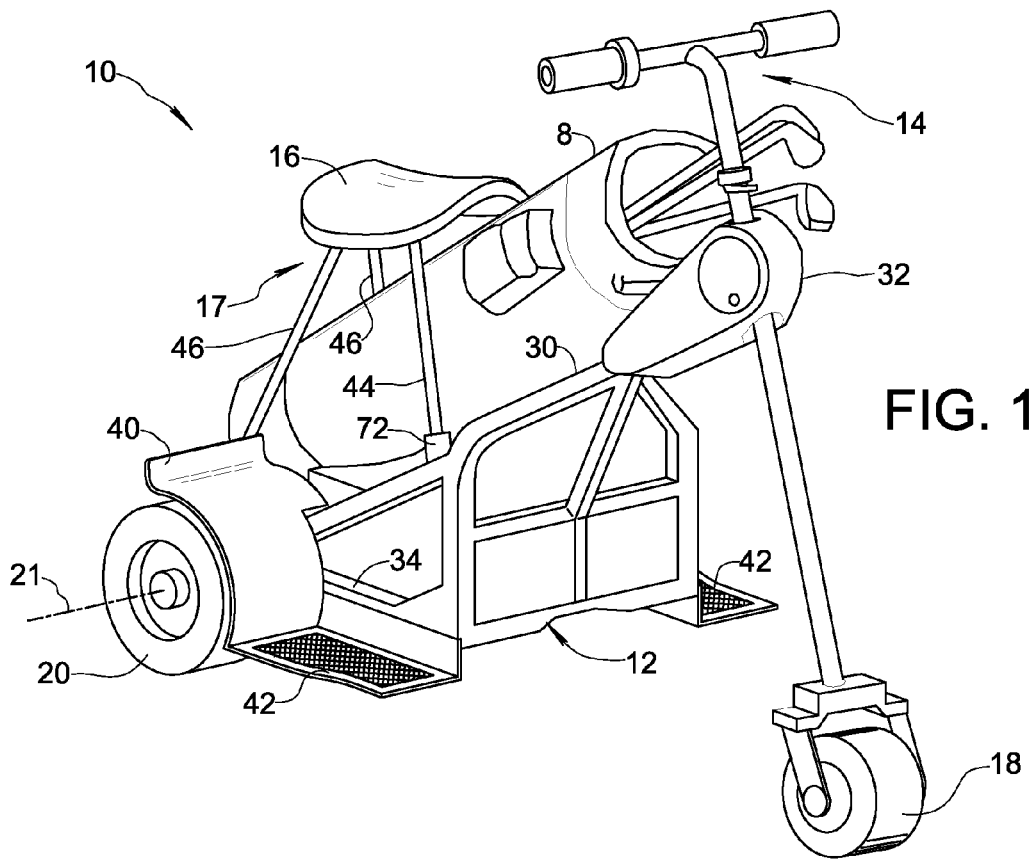
FIG. 1 is a perspective view of a golf caddy vehicle formed in accordance with the present invention, shown carrying a golf bag.
Figure 2:
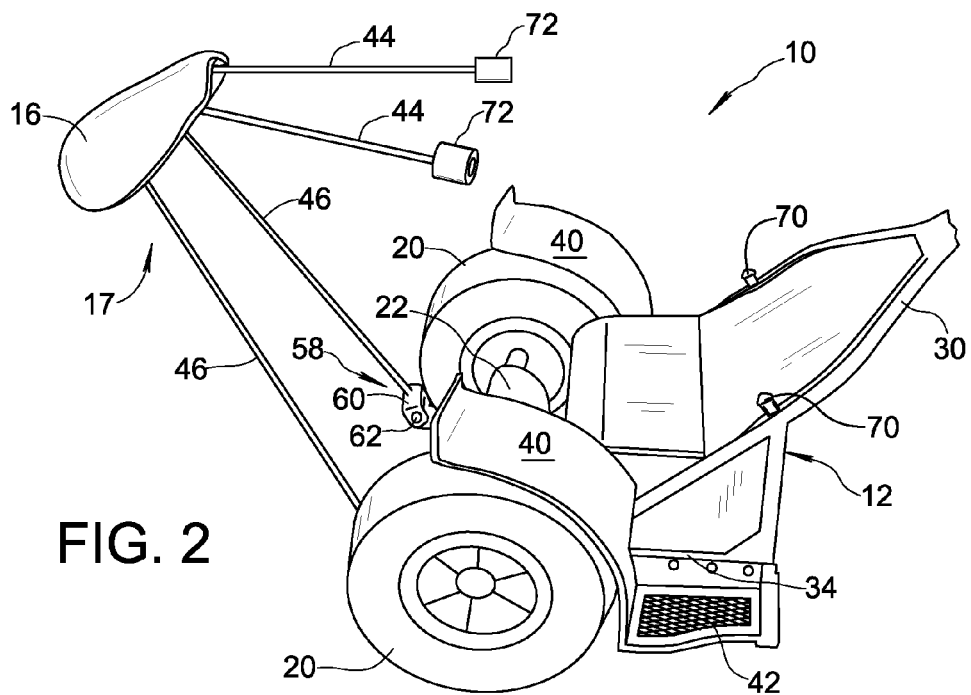
FIG. 2 is a partial perspective view of the golf caddy vehicle shown in FIG. 1, wherein a seat assembly of the vehicle pivoted back and the golf bag removed.
Figure 3:
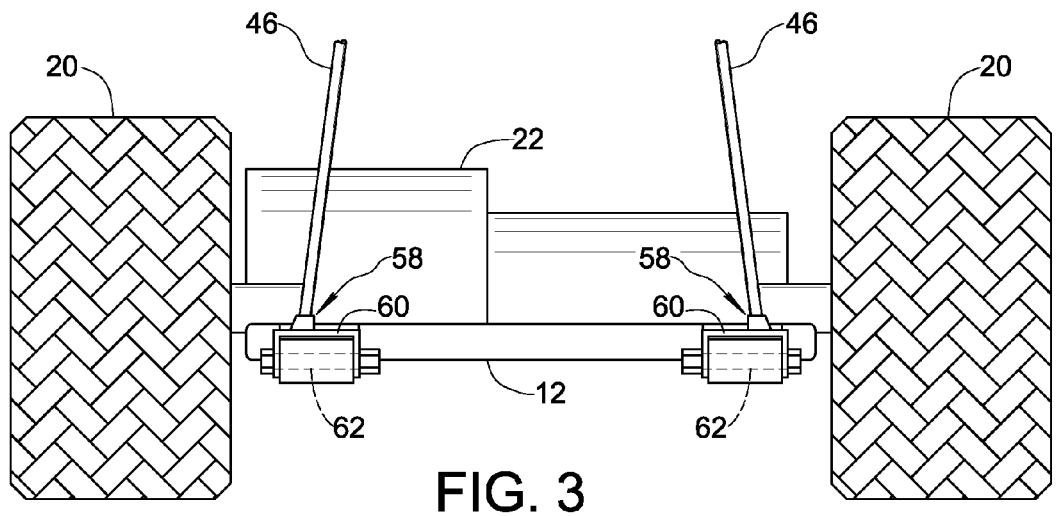
FIG. 3 is an elevational view showing rear portion of the vehicle.

FIGS. 1-3 show a golf caddy vehicle 10 formed in accordance with an embodiment of the present invention. Vehicle 10 generally comprises a frame 12, a steering assembly 14, a seat 16, a front steering wheel 18 forming part of steering assembly 14, a pair of rear drive wheels 20 rotatable about a rear axis 21, a motor 22 connected to drive wheels 20, and a control panel (not visible) connected to motor 22.

Frame 12 is constructed of a durable rigid material, preferably metal, and in the depicted embodiment the frame includes an inverted Y-shaped main member 30, an outer casing 32 provided at an upper portion of the main member 30, and a platform portion 34 fixed to and depending from a lower portion of the main member 30. Frame 12 is configured to support a golf bag 8 (not a part of the present invention) in an inclined position as shown in FIG. 1. Alternative configurations of frame 12 designed to support a golf bag are of course possible, and any configuration that supports a golf bag may be used. A pair of arcuate splash guards 40 are associated with rear drive wheels 20, and a foot rest 42 may be fixed to each splash guard 40 and to platform portion 34 just in front of the associated rear drive wheel 20.

Seat 16 is part of a seat assembly 17 that also includes a pair of front legs 44 (only one being visible in FIG. 1) and a pair of rear legs 46 attached to seat 16. Seat assembly 17 is arranged to straddle golf bag 8 as shown in FIG. 1.

Figure 4:
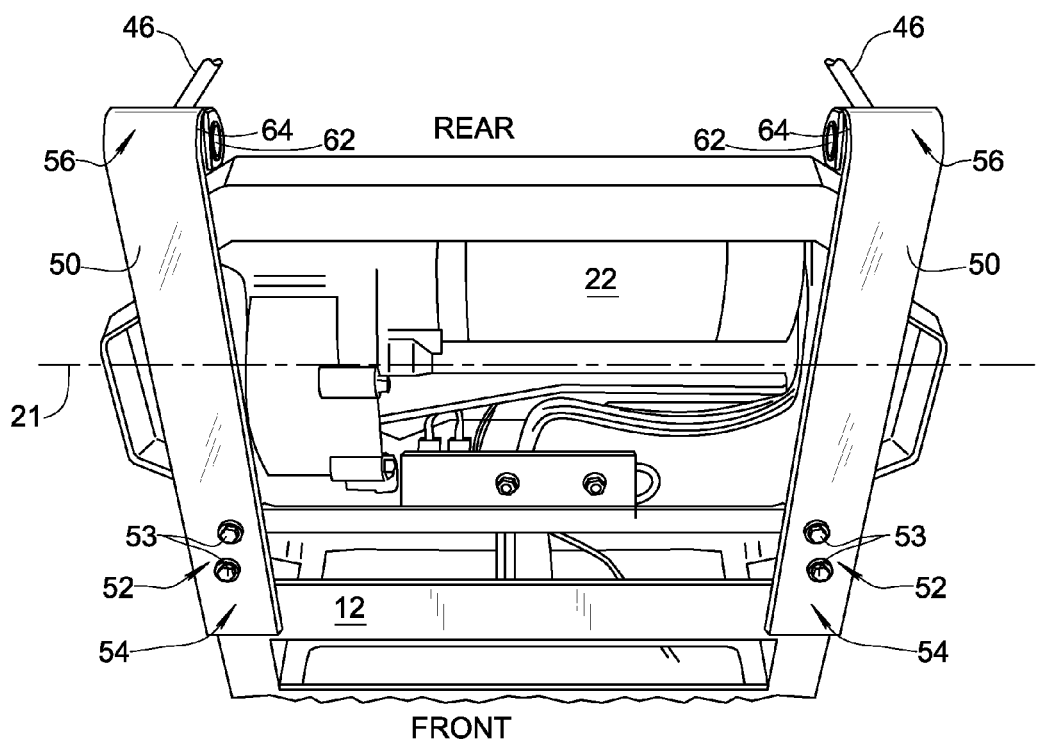
FIG. 4 is a bottom perspective view showing the underside of the rear portion of the vehicle.

Reference is also made to FIG. 4 showing the underside of vehicle 10. In accordance with the present invention, seat assembly 17 is mounted on frame 12 by at least one spring element 50. In the embodiment shown, a pair of spring elements 50 are provided in spaced arrangement from each other, one on each lateral side of vehicle 10. Each spring element 50 is fixed to frame 12 at an attachment location 52 aligned with or ahead of the rear axis 21. Threaded fasteners 53, rivets, welds, or a combination thereof may be used to fix each spring element 50 to frame 12 at attachment location 52. The pair of spring elements 50 may be leaf springs each having a first end 54 fixed to the underside of frame 12 at attachment location 52 ahead of rear axis 21 and a second end 56 located behind rear axis 21, as seen in FIG. 4. Spring elements 50 may be formed by halving a double-eye leaf of a standard trailer leaf spring, or custom-designed leaf springs may be used. Attachment location 52 may be varied, as long as it is not behind rear axis 21. The location of second end 56 may also be varied, as long as it is aligned with or behind the rear axis 21 and behind attachment location 52.

Respective bottom ends 58 of rear legs 46 are pivotally coupled to the second ends 56 of spring elements 50. A U-shaped clevis 60 is provided at bottom end 58 of each rear leg 46 for receiving a pivot pin 62 arranged to extend through a curled sleeve 64 formed at second end 56 of associated spring element 50. Consequently, seat assembly 17 is pivotally coupled to spring elements 50 at a location aligned with or behind rear axis 21. As may be observed from FIG. 2, seat assembly 17 pivots relative to frame 12 about a pivot axis defined by pivot pins 62 to allow golf bag 8 to be loaded onto or unloaded from the frame.

Front legs 44 of seat assembly 17 each have a respective bottom end 66 releasably attached to frame 12. In the embodiment shown, releasable attachment is accomplished by frictional fittings 68 having a male member 70 fixed to main member 30 of frame 12 and a mating female member 72 fixed to bottom end 66 of the associated leg 44, whereby the front legs 44 may be quickly and easily detached from the frame and reattached by pulling and pushing, without the need to operate a release mechanism or lock mechanism. Male member 70 and female member 72 may be formed of a vibration damping material, such as natural or synthetic rubber, to further enhance rider comfort.

As will be appreciated from the foregoing description, vehicle 10 of the present invention solves the problems mentioned above found in the prior art vehicle disclosed in Publication No. 2008/0023236 A1. By mounting rear legs 46 for pivotal movement relative to frame 12, and by using frictional fittings 68 at front legs 44, the invention simplifies the task of moving seat assembly 17 out of the way for loading or removing a golf bag, and the task of resetting the seat for riding is likewise simplified. Burdensome thumbscrews of the prior art have been eliminated. The invention solves the problem of backwards tipping by repositioning the attachment location at which load from the rear legs 46 of the seat assembly 17 is transferred to frame 12 to a location 52 aligned with or ahead of the rear axis 21 about which rear drive wheels 20 rotate. Finally, shock absorption is increased to improve rider comfort by using one or more spring elements 50 to connect rear legs 46 of seat assembly 17 to frame 12 and by releasably attaching front legs 44 of the seat assembly to the frame using frictional fittings 68 formed of vibration damping material.

What is claimed is:

1. A caddy vehicle comprising:
   a frame configured to support a golf bag;
   a pair of rear drive wheels connected to the frame for rotation about a rear axis;
   at least one spring element fixed to the frame at an attachment location aligned with or ahead of the rear axis; and
   a seat assembly connected to the frame and arranged to straddle the golf bag, wherein the seat assembly is pivotally coupled to the at least one spring element at a location aligned with or behind the rear axis, and the seat assembly pivots relative to the frame to allow the golf bag to be loaded onto or unloaded from the frame.

2. The caddy vehicle according to claim 1, wherein the seat assembly includes a pair of rear legs each having a bottom end pivotally coupled to the at least one spring element.

3. The caddy vehicle according to claim 2, wherein the at least one spring element includes a pair of spring elements each having a first end fixed to the frame at the attachment location and a second end located behind the rear axis, and the bottom ends of the pair of rear legs are pivotally coupled to the second ends of the pair of spring elements.

4. The caddy vehicle according to claim 3, wherein each of the pair of spring elements is a leaf spring.

5. The caddy vehicle according to claim 3, wherein the attachment location is ahead of the rear axis.

6. The caddy vehicle according to claim 1, wherein the seat assembly includes a pair of front legs each having a bottom end releasably attached to the frame.

7. The caddy vehicle according to claim 6, wherein each of the bottom ends of the pair of front legs is releasably attached to the frame by a respective frictional fitting.

8. The caddy vehicle according to claim 7, wherein the frictional fitting includes a male member and a female member sized to frictional receive the male member.

9. The caddy vehicle according to claim 8, wherein the male member and the female member are formed of a vibration damping material.

10. The caddy vehicle according to claim 8, wherein the male member is fixed to the frame and the female member is fixed to the bottom end of one of the pair of front legs.

\* \* \* \* \*